United States Patent
Gerlings

(10) Patent No.: US 9,298,819 B2
(45) Date of Patent: Mar. 29, 2016

(54) METHOD AND CONTROL UNIT FOR DETERMINING AN IDENTIFICATION CODE FOR AN AUDIO DATA PACKET

(71) Applicant: Karl-Heinz Gerlings, Hannover (DE)

(72) Inventor: Karl-Heinz Gerlings, Hannover (DE)

(73) Assignee: ROBERT BOSCH GMBH, Stuttgart (DE)

( * ) Notice: Subject to any disclaimer, the term of this patent is extended or adjusted under 35 U.S.C. 154(b) by 378 days.

(21) Appl. No.: 13/734,124

(22) Filed: Jan. 4, 2013

(65) Prior Publication Data

US 2013/0173036 A1    Jul. 4, 2013

(30) Foreign Application Priority Data

Jan. 4, 2012 (DE) .................. 10 2012 200 083

(51) Int. Cl.

| | |
|---|---|
| *G06F 17/00* | (2006.01) |
| *G06F 17/30* | (2006.01) |
| *H04H 60/74* | (2008.01) |
| *H04N 21/439* | (2011.01) |
| *H04N 21/81* | (2011.01) |
| *H04N 21/84* | (2011.01) |
| *G06Q 30/06* | (2012.01) |

(52) U.S. Cl.

CPC .......... *G06F 17/30749* (2013.01); *G06F 17/00* (2013.01); *G06Q 30/06* (2013.01); *H04H 60/74* (2013.01); *H04N 21/4394* (2013.01); *H04N 21/8113* (2013.01); *H04N 21/84* (2013.01)

(58) Field of Classification Search

CPC ................... G06F 17/30787; G06F 17/30817; H04N 21/4722; H04N 21/47815; H04N 21/8113

See application file for complete search history.

(56) References Cited

U.S. PATENT DOCUMENTS

| | | | |
|---|---|---|---|
| 2006/0167903 A1* | 7/2006 | Smith et al. .................. | 707/100 |
| 2011/0041154 A1* | 2/2011 | Olson ............................ | 725/54 |
| 2012/0159535 A1* | 6/2012 | Gratton et al. ................. | 725/32 |

\* cited by examiner

*Primary Examiner* — Andrew C Flanders
(74) *Attorney, Agent, or Firm* — Kenyon & Kenyon LLP

(57) ABSTRACT

A method for determining an identification code for an audio data packet. The method includes receiving an audio data stream and a temporally audio metadata stream. The audio data stream includes an audio data packet and partial identification data. The audio metadata stream includes an identification code. The audio data stream is stored in the buffer, and the audio data packet is output, the audio metadata stream temporally no longer corresponding to the audio data stream when the audio data packet is output. A recording signal is read when outputting a buffer-stored audio data packet to be selected, and the partial identification data of the selected buffer-stored audio data packet is stored. A portion of the audio metadata stream currently received is analyzed to determine the identification code for the audio data packet if the stored partial identification data match the data from the audio metadata stream.

20 Claims, 2 Drawing Sheets

METHOD AND CONTROL UNIT FOR DETERMINING AN IDENTIFICATION CODE FOR AN AUDIO DATA PACKET

CROSS REFERENCE

The present application claims the benefit under 35 U.S.C. §119 of German Patent Application No. DE 102012200083.6 filed on Jan. 4, 2012, which is expressly incorporated herein by reference in its entirety.

FIELD

The present invention relates to a method for determining an identification code for an audio data packet, to a corresponding device and a corresponding computer program product.

BACKGROUND INFORMATION

Various radio systems offer so-called song-tagging services. The basic principle of such services consists of storing an identification code (e.g., a 32-bit Apple ID) assigned to the audio content just played when a keystroke is executed. At a later point, such a stored identification code (e.g., the Apple ID) can be transmitted via a computer (such as an iPod/iPhone) to the PC and this song then be purchased or generally obtained from a remote data store (such as an iTunes store). To do so, in an implementation in HD radio, the identification code (the ID) is transmitted as component of the program service data and the station information service data and may then be extracted there. In an implementation in FM radio, an iTunes tagging ODA (open data application), for instance, is able to be transmitted via RadioText+, from which the Apple ID is extracted. In an implementation in XM radio, the identification code (e.g., the Apple ID) can be transmitted via a song tagging data service (for instance according to the XM spec: SX-9845-0043_Song_Tagging_XM_Band.pdf). The assignment of the identification code (Apple ID) to the audio program content is made via a PID (program identification, which represents a unique 4-byte time stamp, which is assigned to each song transmitted during the day), the PID being transmitted with the audio program and also via a data service as part of a so-called tag label group. The song tagging data service transmits tag label groups for all channels of the XM channel lineup. Said XM specification describes the assignment process as the localization of tag label groups for an SID-of-interest (SID being an identifier of an audio channel). Because of the time offset between the audio program and the label group transmission, two label groups are to be buffer-stored for these SIDs, and the PIDs compared to the PID of the selected audio channel. If a match is found, the Apple ID and associated song metadata are to be persistently stored for a later transmission to the iPod in the device.

SUMMARY

The present invention provides an example method for determining an identification code for an audio data packet, and also a device which uses this method and finally, it provides a corresponding computer program product.

In accordance with the present invention, an example method for determining an identification code for an audio data packet is provided, the example method including the following steps:

receiving an audio data stream and an audio metadata stream which temporally corresponds to the audio data stream; the audio data stream includes an audio data packet and partial identification data, which equivocally describe the audio data packet, and the audio metadata stream includes an identification code which is able to be determined using the partial identification data and which allows an unequivocal description of the audio data packet;

buffer-storing the audio data stream and outputting the audio data packet, the audio metadata stream temporally no longer corresponding to the audio data stream when the buffer-stored audio data packet is output;

reading in a recording signal when a buffer-stored audio data packet to be selected is output, and storing the partial identification data of the selected buffer-stored audio data packet; and analyzing at least a portion of the currently received audio metadata stream, in order to determine the identification code for the audio data packet if the stored partial identification data match the data from the audio metadata stream.

An identification code may be understood to denote identifying data which allow an unequivocal identification of an audio data packet. An audio data packet may denote a cohesive block of audio data which, when reproduced, corresponds to a song, for instance. Partial identification data, for example, are data that represent an equivocal identification of an audio data packet. For example, the partial identification data may identify a singer or a title of a song, but not a precise recording version of this title. An audio metadata stream, for instance, may denote a data stream containing additional data that is not provided for an acoustic reproduction, which data, for instance, allow an unequivocal identification of the audio data packet in connection with the partial identification data. For example, such an audio metadata stream may contain data which, when reproduced, represent a cover of a sound carrier on which the currently reproduced audio data packet is commercially available. As an alternative or in addition, it is also possible that the audio metadata stream includes data in connection with a concert tour of a singer of the audio data packet (song), and/or multiple different recordings of an audio data packet content in different situations or at different times. In the process, a transmitter emits the audio metadata stream in a manner that temporally corresponds to the audio data stream. This means that the transmission of the audio data stream is simultaneously accompanied by a transmission of an audio metadata stream, which contains data that enable an unequivocal description or identification of the audio data packet with the aid of the partial identification data. However, the audio data stream and the audio metadata stream are separated in order to facilitate processing of the audio data stream including an extraction and reproduction of the audio data packet. This makes it possible to create simple devices for reproducing the audio data packets, which do not require a special functionality due to information from the audio metadata stream. Buffer-storing the audio data packet may mean storing this packet during an interval that is greater than a predefined storage duration. For example, this storage duration may be five or ten minutes, whereas the data from the audio metadata stream are not stored, so that a temporal correspondence between the audio data stream and the audio metadata stream is lost. This makes it possible to create less complex evaluation units, since no large memories are required to store the information from the audio metadata stream. If an audio data packet that was buffer-stored is output subsequently, the temporal correspondence between the audio data packet and the information to be obtained from the audio metadata stream no longer exists. The read-in of a recording signal may mean, for instance, reading in a signal from a switch to be operated manually, which was operated by a user of a device executing the method while a buffer-stored audio data packet to be selected is reproduced or output. In response to the read-in recording signal, the particular partial identification data that represent the selected buffer-stored audio data packet will then be stored. Analyzing a currently received audio metadata stream may mean a search of a channel or multiple channels of this audio metadata stream. If the stored partial identification data are then detected in the data of the audio metadata stream, an identification code for the audio data packet assigned to the stored partial identification data is able to be determined from the audio metadata stream. This identification code allows an unequivocal identification of the audio data packet output from the buffer-stored audio data stream.

The present invention is based on the realization that an identification code for a reproduced audio data packet can be determined even if the temporal correspondence between the audio data stream and the audio metadata stream has been lost. This utilizes the fact that the audio metadata stream does indeed contain additional information pertaining to a currently transmitted audio data packet when transmitted at the same time as the audio data stream, but that this additional information is often retransmitted cyclically, either on other channels or at different times. This circumstance may be used to obtain an unequivocal identification code for identifying the audio data packet nevertheless, so that it is subsequently possible, for example, to obtain from a data server a data packet that corresponds to the transmitted audio data packet, for instance in order to purchase from an online store a song that corresponds to the audio data packet.

The present invention has the advantage that it no longer requires a large memory for buffer-storing both the audio data stream and the audio metadata stream. Instead, only a memory for buffer-storing the audio data stream needs to be provided, whereas the additional information may be provided at a later point in time.

Furthermore, the present invention provides a device that includes units developed to carry out or implement the steps of the method according to the present invention, or a variant thereof, in the corresponding devices. This embodiment variant of the present invention in the form of a device may also be used to quickly and efficiently achieve the object on which the present invention is based.

In the case at hand, a device may be an electrical device which processes sensor or data signals and outputs control and/or data signals as a function thereof. The device may have an interface developed as hardware and/or software. In a hardware implementation, the interfaces may be part of a so-called system ASIC, for instance, which contains various functionalities of the device. However, it is also possible for the interfaces to consist of discrete, integrated switching circuits or to be at least partially made up of discrete components. In a software implementation, the interfaces could be software modules, which are provided on a microcontroller, for example, in addition to other software modules.

Also advantageous is a computer program product which has program code that may be stored on a machine-readable carrier such as a semiconductor memory, a hard-disk memory or an optical memory, and which is able to be used to implement the method according to one of the specific embodiments described above when the program product is run on a computer or a device.

In one specific embodiment of the present invention, it is advantageous if in the read-in step, at least one item of information about a singer and/or a title of a song is stored as partial identification data in the form of an audio data packet. Such a specific embodiment of the present invention has the advantage that the information about a singer or a title of a song that is output as audio data packet already allows a fairly clear if still equivocal identification of the audio data packet. A precise identification of this data packet may subsequently take place without much effort.

Also advantageous is a specific development of the present invention in which buffer-storing of the audio metadata stream is omitted in the buffer-storing step. Such a development of the present invention offers the advantage that a device for executing the method has a considerably lower memory requirement than in cases where the data from the audio metadata stream have to be buffer-stored as well.

According to another specific embodiment of the present invention, it is also possible that in the receiving step, the audio data stream and the audio metadata stream are received as two separate data streams, especially also as two differently encoded data streams. Such a special development of the present invention offers the advantage that it is possible to process the audio data stream in a technically much simpler manner than when processing the audio metadata at the same time as well.

According to one further specific embodiment of the present invention, in the analyzing step, the audio metadata stream is able to be analyzed for an analyzing period that exceeds a predefined time period. A predefined time period may be understood to denote a time period of one hour, several hours, or one or more days, for instance. Such a specific embodiment of the present invention offers the advantage that the matching identification code for the buffer-stored, output audio data packet is still able to be determined even after a longer search for the partial identification data in the audio metadata stream. This makes it possible to utilize the fact that an identification code matching the partial identification data is often repeated in the audio metadata stream multiple times in cyclical manner, so that at least a certain basic functionality of the audio metadata stream is able to be achieved or ensured nevertheless, even if a temporal correspondence between the audio data stream and the audio metadata stream is lacking.

According to another specific embodiment of the present invention, an identification code which is developed to allow an unequivocal identification of the audio data packet in order to obtain it from an external data store is able to be determined in the analyzing step. An identification code of this type, for example, corresponds to a predefined standard for identifying individual audio data packets. Such a specific development of the present invention offers the advantage that an audio data package that had previously been buffer-stored and output may be purchased in a very uncomplicated manner by a user of a variant of the method described above.

According to another specific embodiment of the present invention, the stored partial identification data are able to be compared to data from multiple channels of the audio metadata stream analyzed in parallel and/or at a time offset in the analyzing step, in order to determine the identification code. Such a specific embodiment of the present invention offers the advantage that individual channels of the audio metadata stream are able to be analyzed separately, so that an identification code corresponding to the partial identification data is able to be obtained more rapidly.

Below, the present invention is explained in greater detail with reference to the figures and by way of example.

DETAILED DESCRIPTION OF EXAMPLE EMBODIMENTS

Figure 1:
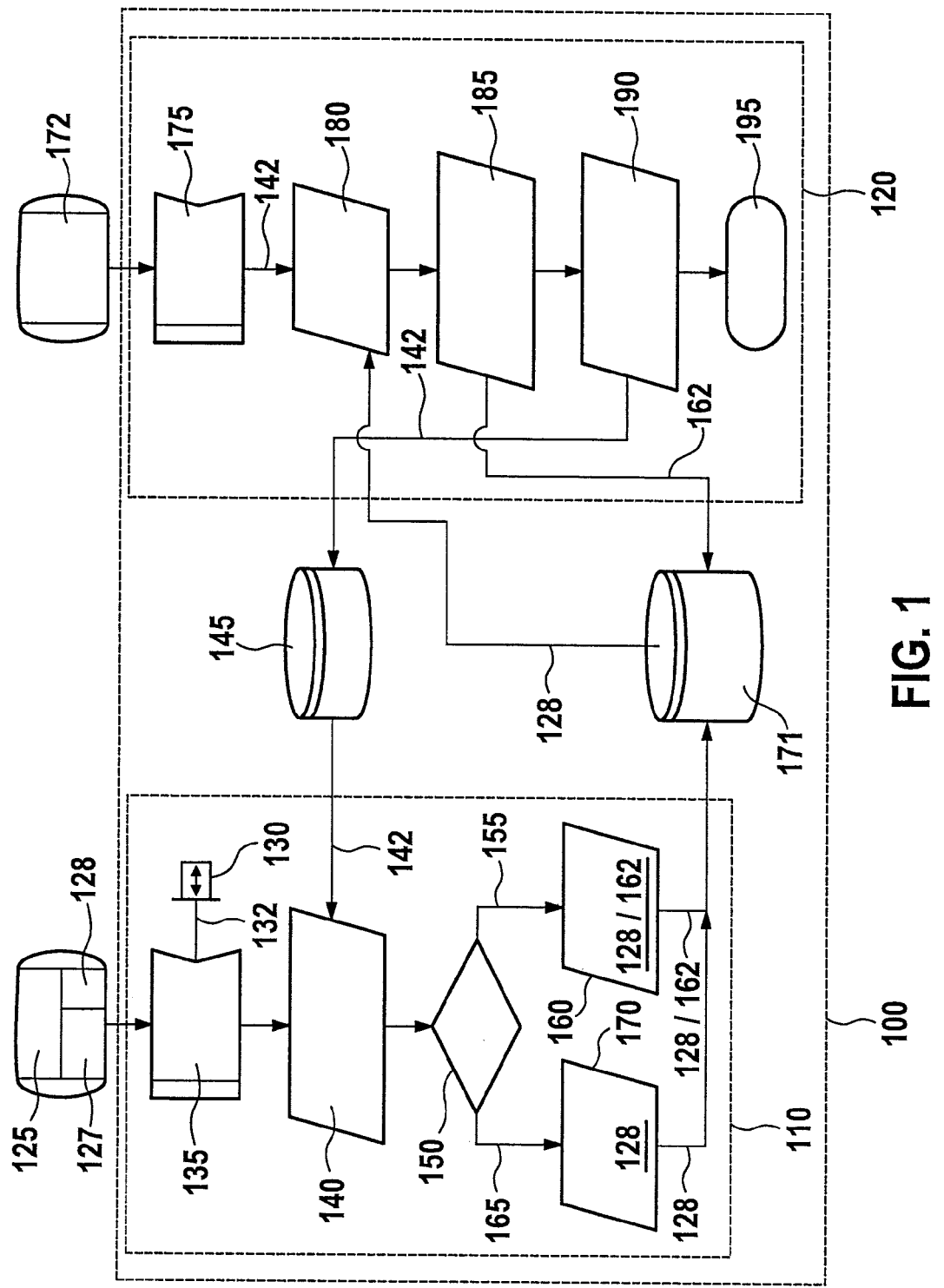
FIG. 1 shows a block diagram of an exemplary embodiment of the present invention as a device, individual steps to be executed in such a device being illustrated by way of example.

In the description below of preferred exemplary embodiments of the present invention, the same or similar reference numerals are used for the elements that are shown in the various figures and act similarly; a repeated description of these elements has been dispensed with.

FIG. 1 shows a block diagram of one exemplary embodiment of the present invention as device 100; steps to be executed in such a device 100 by way of example are shown in schematic manner in the form of a flow chart for a method. An audio-data-stream processing unit 110 and an audio-metadata-stream processing unit 120 are provided in this device 100. In audio-data-stream processing unit 110, an audio data stream 125 is read via an interface, this audio data stream 125 (audio service) containing an audio data packet 127 (such as a song to be reproduced), which is provided with partial identification data 128 so that this audio data packet 127 is able to be identified unequivocally. If a vehicle in which device 100 is situated is switched off, for instance for refueling purposes (fuel stop), this audio data stream 125 is able to be buffer-stored. If such a refueling stop has ended and the driver puts the vehicle back into operation, buffer-stored audio data stream 125 may be used again, for instance in that audio data packet 127, which had been reproduced only partially prior to the buffer storage, continues to be reproduced or continues to be output. If the driver or some other user of the vehicle likes the currently reproduced song in the form of audio data packet 127, then the user of device 100 is able to press a button 130 and thereby generate a recording signal 132, which is read in by audio-data-stream processing unit 110 in a read-in step 135 (user depresses tag button). In this case, partial identification data 128 assigned to audio data packet 127 are stored, and in a subsequent step 140, they are compared to buffer-stored identifier groups 142, which are loaded from a identifier-group circular buffer 145, which is able, for example, to buffer-store three identifier groups 142 (comparison of the PID to buffer-stored label groups of the song tagging service). These identifier groups 142 include information which, on the one hand, contains partial identification data 128 and, on the other, data that allow an unequivocal identification of audio data packet 127 by determining an identification code for audio data packet 127. Then, if it is detected in a step 150 (match?) that the partial identification data (which may include an identification designation PID as partial identification data) is included in one of the identifier groups 142 stored in buffer 145, storing 160 of metadata of the audio data packet (i.e., the song) and, for example, an identification code 162 for purchasing audio data packet 127 from an external store (e.g., an Apple ID as identification code 162 for purchasing the song as audio data packet 127 from an iTunes store), takes place in a first alternative 155. On the other hand, if it is determined according to a second alternative 165 that partial identification data 127 are not included in the content of identifier group 142, only metadata in connection with audio data packet 127 are buffer-stored (step 170), such as partial identification data 128, which, however, allow only an equivocal identification of audio data packet 127. The result (i.e., the determined obtained data) of the comparison from step 150 is subsequently stored in a permanent audio-data-packet information memory 171 (persistent song tag database) and called up again according to the following description.

Audio-metadata-stream processing unit 120 is designed to process an audio metadata stream 172. This audio metadata stream 172 is a data stream that includes supplementary information about the audio data (packets) 127 currently output in audio data stream 125, which may be desired by a user of device 110 in order to be able to use the content of audio data packets 127 output in audio data stream 125 at a later date as well, e.g., following the purchase of a data packet which is identical with audio data packet 127 and represents a song of a singer in a particular recording.

Audio-metadata stream 172 therefore contains information which is transmitted in temporal correspondence with the data from audio data stream 125. Audio metadata stream 172 may include multiple channels that correspond to multiple different audio data streams 125, in order, for instance, the supplementary information desired by a user not only for a single audio data stream, but for a series of audio data streams transmitted in parallel, as they may be generated by multiple, different programs of a radio station, for instance. That is to say, information in the form of identifier group 142 (tag label group) (step 175), which represents additional information relating to temporally corresponding data from audio data stream 125, is read in by audio-metadata-stream processing unit 120 via an interface. The data from audio metadata stream 172 is not buffer-stored, so that a required memory in device 100 or in audio-metadata-stream processing unit 120 is able to be kept as small as possible. In a following step 180, an identification of a selected audio data packet, such as the partial identification data, is transmitted from audio-packet information memory 171 to audio-metadata-stream processing unit 120. A check as to whether a corresponding identification code for these partial identification data is present in an identifier group 142 of audio metadata stream 172 then takes place in audio-metadata-stream processing unit 120. As a result, a search for a PID in a song tag database is performed in step 180. Then, if it has been determined in a step 100 following 80 that an unequivocal identification was possible, i.e., if a PID for a corresponding song has been found, the particular identification code is added to a memory entry; this information (i.e., the identification code) once again is also supplied to audio-data-packet information memory 171 and linked with the partial identification data from the audio data packet. Furthermore, following step 185, a further step 190 is executed, in which an identifier group 142 for an audio data stream 125 of particular interest to a user (SID of interest) is filtered out and buffer-stored. This filtered-out identifier group 142 includes the particular supplementary information (i.e., metadata) assigned to audio data packet 125, which was selected by the user of device 100. This filtered-out identifier group 142 then is written into identifier group circular buffer 145, in order to allow a rapid identification of additional audio data packets 125 that the user, given a liking for a particular audio data stream 125 (such as a particular radio station), may possibly want to select as well. The method introduced here ends 195 following step 190.

In other words, the approach introduced here also allows tagging if song tagging data service 172 is unavailable at the time of audio transmission 125. Such an approach is possible in particular when using a MOST-network system, the processing of the song tagging data service taking place in a different component than the processing of the audio service.

If a vehicle in which a corresponding device is situated is switched off (e.g., during a refueling stop), audio service 125 is buffer-stored and may be listened to at a time-offset (that is to say, a time shift takes place). Since the MOST bus is shut down during this time, the identification codes (e.g., Apple IDs for the buffer-stored songs, are unable to be determined. With time-offset listening, the user may use the tagging service only to a limited degree. In such a case, for example, only the song title and artist are stored as partial identification data. This allows a temporal decoupling of tagging by the user and a determination of the identification code (such as the Apple ID) by persistent storage (e.g., in memory 171) even of incomplete data sets, and retroactive searching for matching identification codes (Apple IDs) in all (e.g., more than >200) audio channels of the XM channel lineup, which represents an audio metadata stream. Using as partial identification data a PID that is equivocal for a longer period of time (e.g., with a uniqueness for one moth) makes this possible beyond the current date.

The flow chart illustrated in FIG. 1 shows the sequences of the song tagging described by XM by way of example and especially in steps 170, 180 and 185, innovations over the related art. More specifically, in a first step, when the user presses tag key 130, audio service 125 stores the song metadata including PID (as partial identification data), even if song tagging data service 172 happens to be currently unavailable, for instance because the temporal correspondence has been lost. In a further step, a check of song tagging data service 172 takes place, initially upon arrival of each tag label group 142, so as to ascertain whether the song tag database includes an incomplete data set which may be supplemented by the identification code just received (such as the Apple ID). Only then will filtering for the SID of interest described in the XM specification, and the buffer-storing of three labels 142 in buffer 145 take place. The way the PID (i.e., the partial identification data) is defined these days, incomplete data sets of song tag database 172 should receive a date identifier, since the PID is unequivocal only within one day. However, since no use of the PID other than song tagging is known, this program identifier is also realizable in a different manner. For example, an ID may be used that is permanently assigned to an audio song (in the simplest case, the Apple ID), or else also an index of the SX-song database. It is also possible to use a time stamp which includes the day. In such a modification of the PID, the described search function in the channel lineup (i.e., via the audio metadata) may take place over a longer period of time.

Figure 2:
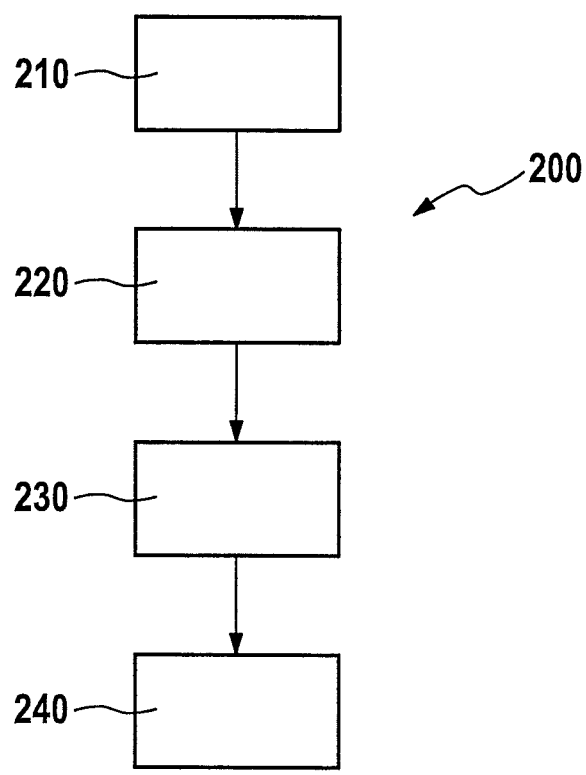
FIG. 2 shows a flow chart of an exemplary embodiment of the present invention as a method.

FIG. 2 shows a flow chart of an exemplary embodiment of the present invention in the form of method 200 for determining an identification code for an audio data packet. Method 200 includes a step of receiving (210) an audio data stream and an audio metadata stream which temporally corresponds to the audio data stream; the audio data stream includes an audio data packet and partial identification data, which describe the audio data packet ambiguously, and the audio metadata stream includes an identification code, which is able to be determined using the partial identification data and which allows an unambiguous description of the audio data packet. In addition, method 200 includes a step of buffer-storing 220 the audio data stream, and outputting the audio data packet of the buffer-stored audio data stream, the audio metadata stream temporally no longer corresponding to the audio data stream when the audio data packet is output. Finally, method 200 includes a step of reading in 230 a recording signal when a buffer-stored audio data packet to be selected is output, and storing the partial identification data of the selected buffer-stored audio data packet. Finally, the method includes a step of analyzing 240 at least a portion of the currently received audio metadata stream, in order to determine the identification code for the audio data packet if the stored partial identification data match the data from the audio metadata stream.

The exemplary embodiments described and shown in the figures have been selected merely as examples. Different exemplary embodiments are combinable with one another, either completely or with regard to individual features. An exemplary embodiment may also be supplemented by features of another exemplary embodiment.

Furthermore, method steps according to the present invention may be carried out repeatedly and also performed in a sequence other than the one described.

If an exemplary embodiment includes an "and/or" linkage between a first feature and a second feature, this may be understood to mean that the exemplary embodiment according to one specific embodiment has both the first feature and the second feature, and according to an additional specific embodiment, either has only the first feature or only the second feature.

What is claimed is:

1. A method for determining an identification code for an audio data packet, the method comprising:
   receiving an audio data stream and an audio metadata stream which temporally corresponds to the audio data stream, the audio data stream including an audio data packet and partial identification data, the partial identification data equivocally describing the audio data packet, the audio metadata stream including an identification code, which is able to be determined using the partial identification data and which allows an unequivocal description of the audio data packet;
   buffer-storing the audio data stream and outputting the audio data packet of the buffer-stored audio data stream, the audio metadata stream no longer temporally corresponding to the audio data stream when the audio data packet is output;
   reading in a recording signal when a buffer-stored audio data packet to be selected is output, and storing the partial identification data of the selected buffer-stored audio data packet; and
   analyzing at least a portion of the currently received audio metadata stream to determine the identification code for the audio data packet if the stored partial identification data match the data from the audio metadata stream.

2. The method as recited in claim 1, wherein in the reading in step, information about at least one of a singer and a title of a song is read in as the audio data packet.

3. The method as recited in claim 1, wherein in the buffer-storing step, buffer-storing of the audio metadata stream is omitted.

4. The method as recited in claim 1, wherein in the receiving step, the audio data stream and the audio metadata stream are received as two separate data streams.

5. The method as recited in claim 4, wherein the two separate data streams are two differently encoded data streams.

6. The method as recited in claim 1, wherein in the analyzing step, the audio metadata stream is analyzed for an analyzing period that exceeds a predefined time period.

7. The method as recited in claim 1, wherein in the analyzing step, an identification code is determined, which allows an unambiguous identification of the audio data packet for a separate purchase from an external data store.

8. The method as recited in claim 1, wherein in the analyzing step, the stored partial identification data are compared to data from a plurality of channels of the audio metadata stream analyzed at least one of in parallel and at a time offset, to determine the identification code.

9. A device for determining an identification code for an audio data packet, wherein the device is configured to:
   receive an audio data stream and an audio metadata stream which temporally corresponds to the audio data stream, the audio data stream including an audio data packet and partial identification data, the partial identification data equivocally describing the audio data packet, the audio metadata stream including an identification code, which is able to be determined using the partial identification data and which allows an unequivocal description of the audio data packet;
   buffer-store the audio data stream;
   output the audio data packet of the buffer-stored audio data stream, the audio metadata stream no longer temporally corresponding to the audio data stream when the audio data packet is output;
   read in a recording signal when a buffer-stored audio data packet to be selected is output;
   store the partial identification data of the selected buffer-stored audio data packet; and
   analyze at least a portion of the currently received audio metadata stream to determine the identification code for the audio data packet if the stored partial identification data match the data from the audio metadata stream.

10. A non-transitory computer-readable storage medium storing program code for determining an identifiable code for an audio data packet, the program code, when executed by a unit, causing the unit to perform the steps of:
   receiving an audio data stream, and an audio metadata stream which temporally corresponds to the audio data stream, the audio data stream including an audio data packet and partial identification data, the partial identification data equivocally describing the audio data packet, the audio metadata stream including an identification code, which is able to be determined using the partial identification data and which allows an unequivocal description of the audio data packet;
   buffer-storing the audio data stream and outputting the audio data packet of the buffer-stored audio data stream, the audio metadata stream no longer temporally corresponding to the audio data stream when the audio data packet is output;
   reading in a recording signal when a buffer-stored audio data packet to be selected is output, and storing the partial identification data of the selected buffer-stored audio data packet; and
   analyzing at least a portion of the currently received audio metadata stream to determine the identification code for the audio data packet if the stored partial identification data match the data from the audio metadata stream.

11. The device as recited in claim 9, wherein the device is configured to read in information about at least one of a singer and a title of a song as the audio data packet.

12. The device as recited in claim 9, wherein the device omits buffer-storing of the audio metadata stream when buffer-storing the audio data stream.

13. The device as recited in claim 9, wherein the device is configured to receive the audio data stream and the audio metadata stream as two separate data streams.

14. The device as recited in claim 13, wherein the two separate data streams are two differently encoded data streams.

15. The device as recited in claim 9, wherein the device is configured to analyze the audio metadata stream for an analyzing period that exceeds a predefined time period.

16. The device as recited in claim 9, wherein the device is configured to determine an identification code which allows an unambiguous identification of the audio data packet for a separate purchase from an external data store.

17. The device as recited in claim 9, wherein the device is configured to compare the stored partial identification data to data from a plurality of channels of the audio metadata stream analyzed at least one of in parallel and at a time offset, to determine the identification code.

18. The non-transitory computer-readable storage medium as recited in claim 10, wherein the program code causes the unit to read in information about at least one of a singer and a title of a song as the audio data packet.

19. The non-transitory computer-readable storage medium as recited in claim 10, wherein the program code causes the unit to receive the audio data stream and the audio metadata stream as two separate data streams.

20. The non-transitory computer-readable storage medium as recited in claim 10, wherein the program code causes the unit to compare the stored partial identification data to data from a plurality of channels of the audio metadata stream analyzed at least one of in parallel and at a time offset, to determine the identification code.

* * * * *